INVENTORS
WALTER T. STOI
ROBERT THOMSON
BY
*Learman & McCulloch*
ATTORNEYS

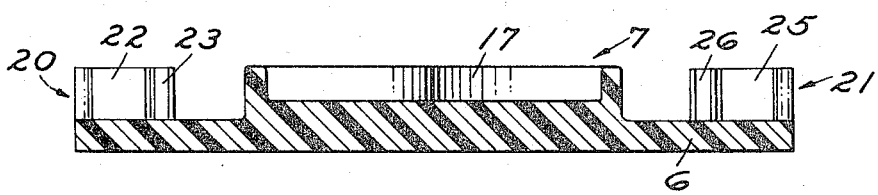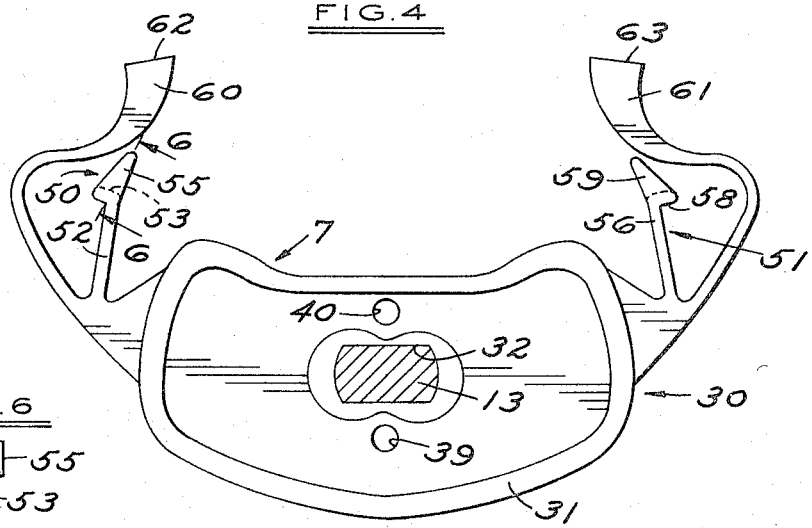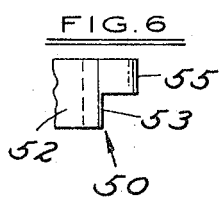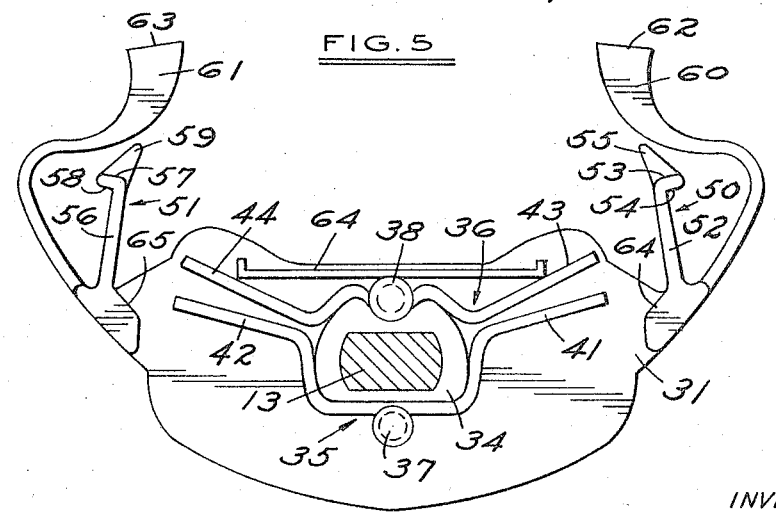

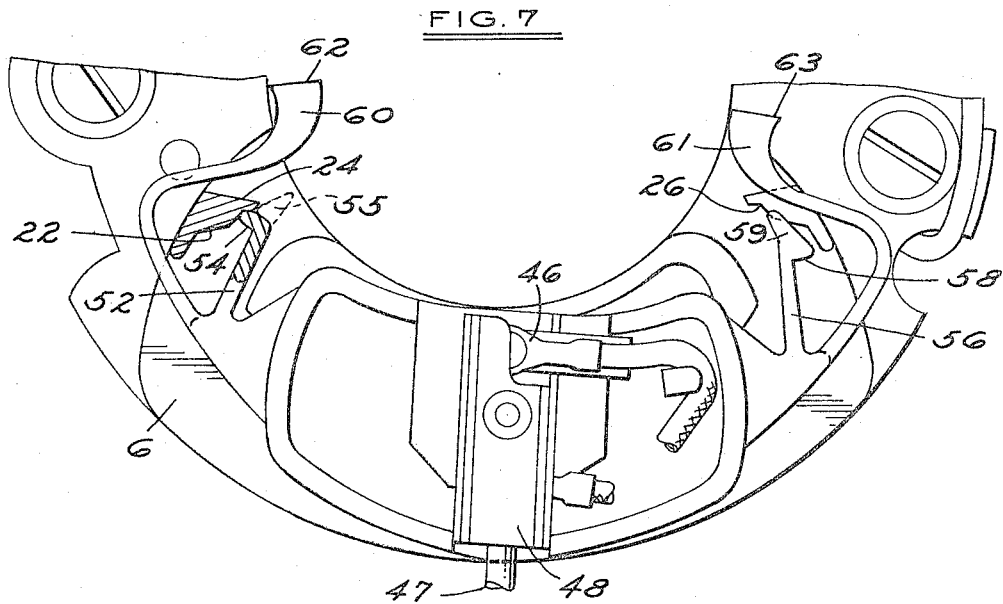
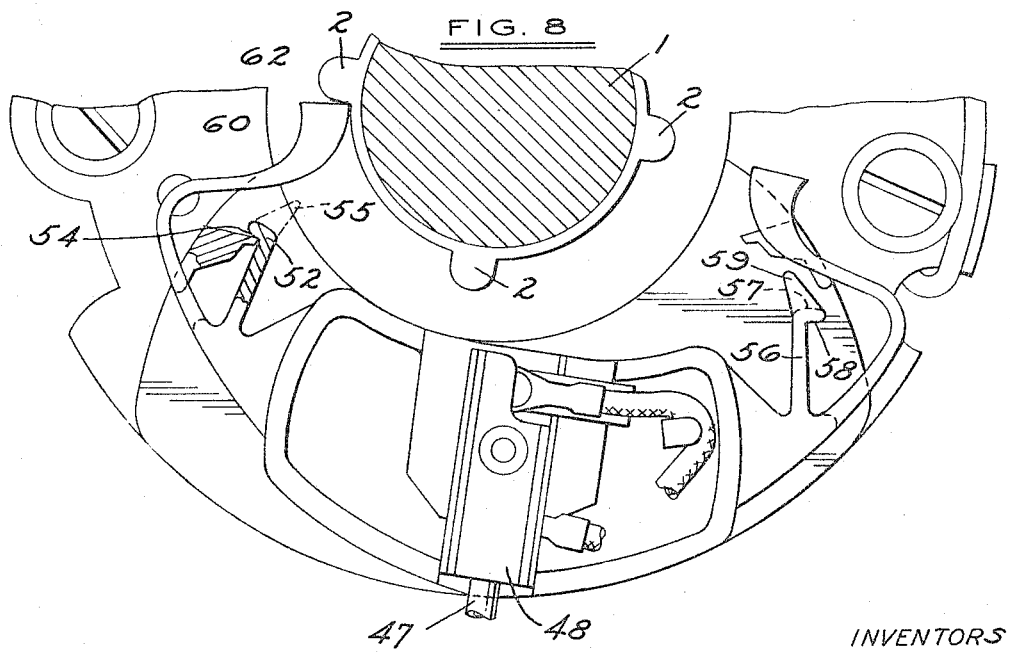

United States Patent Office 3,368,043
Patented Feb. 6, 1968

3,368,043
DIRECTION SIGNALING APPARATUS HAVING LANE CHANGE POSITIONS
Walter T. Stoi, Warren, and Robert Thomson, Dearborn Heights, Mich., assignors to Boyne Products, Inc., Boyne City, Mich., a corporation of Michigan
Filed June 15, 1966, Ser. No. 557,676
13 Claims. (Cl. 200—61.34)

ABSTRACT OF THE DISCLOSURE

Direction signaling apparatus having a support on which is mounted an actuator for manual rocking movement from a neutral position to a latched, operating position in which a set of indicator lamps at one side or the other of a vehicle is actuated and from which position the actuator automatically may be restored to its neutral position, the latching means being capable of arresting movement of the actuator in an intermediate position between the neutral and operating positions in which one or the other set of indicator lamps is actuated and from which intermediate position the actuator automatically is restored to its neutral position.

---

This invention relates to vehicle direction signaling apparatus and more particularly to a direction signaling device having an actuating member which may be moved manually from a neutral position to either one of two turn indicating positions and, at the election of the operator, latched in either turn indicating position or manually held in such position so as automatically to return to its neutral position when it is released by the operator.

In operation of a motor vehicle, it frequently is desirable to indicate either a left-hand or right-hand turn in which event a direction signal actuating member may be move from a neutral position to either a left-hand or right-hand turn indicating position and be latched in such position until the turn is completed, whereupon automatic canceling apparatus controlled by the steering mechanism functions to unlatch the actuator and permit its restoration to its neutral position. In other instances, however, the driver of a vehicle may wish to change from one traffic lane to another and, in heavy traffic conditions, such lane change should be signaled by the direction signaling apparatus. The amount of steering wheel movement necessary to effect a lane change, however, ordinarily is not enough to assure cancelation of an operating direction signal. Accordingly, the vehicle driver must cancel the direction signal manually. Unfortunately, not all drivers cancel the direction signal indicators following the changing from one lane to another. As a result, it is not uncommon for a vehicle to be driven for many miles in heavy traffic with its direction signal indicators operating. This can be both annoying and dangerous.

An object of this invention is to provide direction signal operating apparatus which is capable of being latched in either a left-hand or right-hand turn indicating position, but also is capable of actuating momentarily the left-hand or right-hand direction signal indicators so as to indicate a lane change and which is so constructed as to be returnable automatically to the neutral or inactive position when the lane change has been completed.

Another object of this invention is to provide direction signaling apparatus of the character described and which operates in conjunction with the same parts which enable the direction signal actuator to be latched in an operating position, thereby making it unnecessary to provide parts in addition to those normally provided.

A further object of the invention is to provide direction signal operating apparatus of the character referred to and which enables the operator of the apparatus to sense the position in which the actuating apparatus is adjusted.

Another object of the invention is to provide direction signal operating apparatus having the characteristics described and which is fully compatible with canceling mechanisms of the kind currently in use.

Other objects and advantages of the invention will be pointed out specifically or will become apparent from the following description when it is considered in conjunction with the appended claims and the accompanying drawings, in which:

FIGURE 3 is a sectional view taken on the line 3—3 of FIGURE 2;

FIGURE 4 is a plan view of the actuating member, but with certain parts removed for clarity;

FIGURE 5 is a bottom plan view of the actuating member;

FIGURE 6 is a sectional view taken on the line 6—6 of FIGURE 4;

FIGURE 7 is a view similar to FIGURE 1, but illustrating the actuating member in an intermediate position between its neutral position and one of its latched positions; and FIGURE 8 is a view smilar to FIGURE 7, but illustrating the actuating member in a fully latched position.

Figure 1:
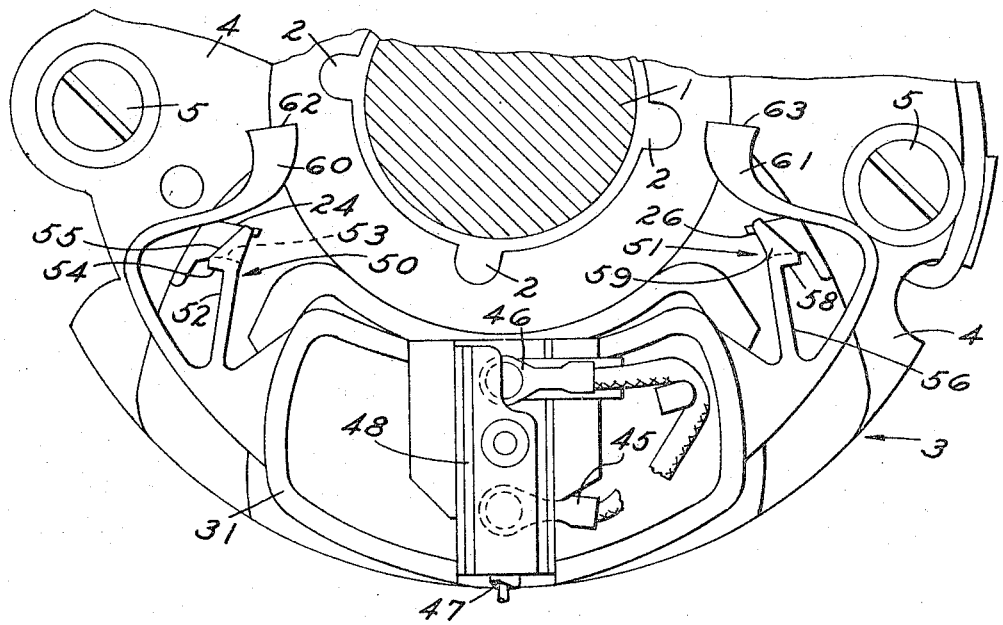
FIGURE 1 is a fragmentary, top plan view of direction signal apparatus constructed and arranged in accordance with the invention, the actuating member of the apparatus being shown in its neutral or inactive position.
Figure 2:
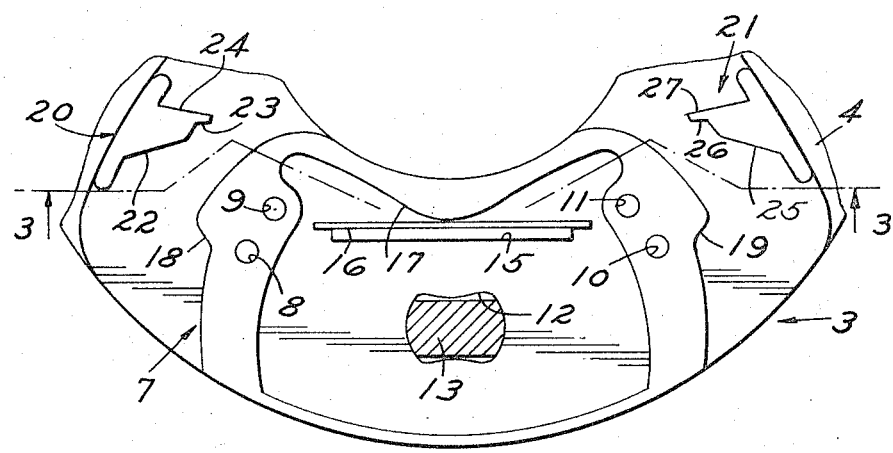
FIGURE 2 is a fragmentary view, partly in plan and partly in section of a support or casing forming part of the direction signal apparatus.

The apparatus disclosed herein functionally is generally similar to that disclosed in United States Patent No. 3,284,592, granted Nov. 8, 1966, but incorporates many improvements over that construction. The present construction also has characteristics similar in many respects to the construction disclosed in United States Patent No. 3,239,619 granted Mar. 8, 1966.

Apparatus constructed in accordance with the invention is adapted for use in conjunction with a vehicle having a rotatable steering member such as a shaft 1 mounted within a tubular column (not shown) and provided with one or more cam lobes 2 which rotate in response to rotation of the steering means. A support designated generally by the reference character 3 may have a mounting ring 4 that is secured to the steering column by screws 5 or the like. The support member 3 includes an arcuate base 6 formed of insulating material such as molded nylon and having between its ends a casing 7 in which are mounted left-hand and right-hand pairs of conductive switch contacts 8, 9, and 10, 11, respectively, which are adapted for connection to the left-hand and right-hand signaling lamps (not shown) of the vehicle. Between the pairs of contacts the casing is provided with a generally hour-glass opening 12 through which extends a rockable, substantially rectangular shaft 13. Between the pairs of contacts the base of the casing 7 is provided with an upstanding rib 15 against which bears a leaf spring 16 that extends above the rib 15 and which also bears against a fulcrum 17 molded into the casing 7. At opposite ends of the casing 7 is a pair of stop members 18 and 19, the purpose of which will be explained hereinafter.

Adjacent opposite ends of the casing 7, but spaced therefrom, the mounting member 4 is provided with a pair of integral, molded, upstanding latch members 20 and 21. The member 20 includes an inclined cam surface 22 which extends generally toward the adjacent end of the casing 7 and terminates in an abutment or projection 23. The abutment 23 terminates in a sharply defined latching surface 24. The member 21 has a cam surface 25 similar to the cam surface 22, an abutment 26 similar to the abutment 23, and a latching surface 27 corresponding to the latching surface 24.

The apparatus includes an actuating member 30 having a generally arcuate body member 31 molded of insulating material and having a centrally located, substantially rectangular opening 32 for reception of the shaft 13 so as to be rockable with the latter. On the inner surface of the actuating member the opening 32 is surrounded by a hub member 34 and against which are secured conductive switch members 35 and 36 that respectively engage contacts 37 and 38 which pass through correspondingly located openings 39 and 40 formed in the body 31. The switch member 35 has arms 41 and 42 which, in the neutral positon of the actuator 30, engage the fixed contacts 8 and 10, respectively, and the switch member has arms 43 and 44 which normally lie between the contacts 8 and 9 and 10 and 11, respectively, without engaging any of them. The contact 37 is adapted to be connected by a conductor 45 to the vehicle stop lamps through the conventional brake actuated switch and a battery or other source of electrical energy so as to enable the rear stop lamps of the vehicle to be illuminated upon depressing the brake pedal. The contact 38 is adapted for connection by a conductor 46 through a flasher unit (not shown) of conventional construction to the electrical energy source.

When the actuating member 30 is rocked from the neutral position shown in FIGURE 1 to either of its two turn indicating positions, the switch members 35 and 36 will rock with the operating member so as to engage and disengage the appropriate fixed contacts and enable the direction signaling lamps at either the left-hand side or the right-hand side of the vehicle to be flashed in the manner more fully explained in the aforementioned application and patent.

An operating handle or lever 47 is fixed to the shaft 13 by means of a coupling 48 so as to effect rocking movement of the actuator 30 either clockwise or counterclockwise from the position shown in FIGURE 1.

At opposite ends of the actuator body 31 is a pair of flexible and resilient latch members 50 and 51. The latch member 50 comprises an arm 52 one end of which is integrally molded with the body 31. Adjacent its free end the arm 52 terminates in a laterally extending, hook-like leg 53 having a latching surface 54 which is adapted to engage the adjacent latch surface 24. A generally triangularly shaped projection 55 extends from the leg 53 toward the steering shaft 1. The upper surfaces of the leg 53 and the projection 55 are coplanar but the leg 53 is of substantially greater depth than that of the projection.

The latch member 51 includes a flexible, resilient arm 56 similar to the arm 52 and having a generally right-angular leg 57 provided with a latching surface 58 adapted to engage the latching surface 27 of the latch member 21. A generally triangularly shaped extension 59 similar to the projection 55 extends from the leg 57 toward the steering shaft 1.

Integrally molded at opposite ends of the actuator body 31 is a pair of flexible latch releasing arms or fingers 60 and 61, the arm 60 terminating in an end wall 62 that is adapted to engage any one of the cams 2. The finger 61 includes a similar wall 63. Adjacent the inner ends of the fingers 60 and 61 and on the inner surface of the actuator are molded integral stops 64 and 65 adapted for engagement with the stops 18 and 19 on the casing. Between its ends the inner surface of the body 31 is provided with a rib 66 that is adapted to engage and bear against the leaf spring 16.

When the apparatus is mounted adjacent the steering shaft 1 in the manner indicated in FIGURE 1, the vehicle driver may indicate a turn by moving the operator lever 47 clockwise to the position shown in FIGURE 7, whereupon the actuating member 30 also will be rocked clockwise, thereby stressing the spring 16 which opposes such movement of the actuator. As the actuating member moves clockwise from its neutral position, the leg 53 of the latch member 50 will engage the cam surface 22 of the latch member 20 and deflect the arm 52 inwardly or toward the adjacent end of the body member 31. When the leg 53 engages the abutment 23 of the latch member 20, the resistance to further clockwise movement of the actuating member 30 will increase so as to arrest further movement of the actuator without the application of additional force on the lever 47. Such increase in the resistance to further movement of the actuator is sufficient to be detected readily by the driver. In this position of the actuating member, the switch member 36 will bridge the fixed contacts 9 and 10, the arm 41 of the switch member 35 will remain in engagement with the fixed contact 8, but the arm 42 will be out of engagement with the fixed contact 10. Thus, the contacts 9 and 10 will be in circuit with the flasher unit so as to effect flashing of the appropriate direction signaling lamps.

As has been stated, the movement of the actuator member from the position shown in FIGURE 1 to the position shown in FIGURE 7 causes the spring 16 to be stressed. Accordingly, should the driver release the handle 47, the spring will restore the actuating member to its neutral position.

When the actuating member 30 is in the position shown in FIGURE 7, the application of additional clockwise force on the lever 47 will cause the abutment 23 to deflect the flexible arm 52 further inwardly or toward the adjacent end of the body member 31 so as to effect further clockwise rocking of the actuating member. When the actuating member has been moved clockwise a distance sufficient to enable the leg 53 to clear the projection 23, the resiliency of the arm 52 will urge the latter outwardly or away from the adjacent end of the body 31 so as to engage the latch surfaces 24 and 54, thereby latching the actuating member in the position shown in FIGURE 8 and preventing the spring 16 from returning the actuating member to its neutral position. The extent of rocking movement of the actuator from the position shown in FIGURE 7 to the latched position shown in FIGURE 8 is not sufficient to effect any change in the electrical relation among the fixed and movable switch contacts. Clockwise movement of the actuating member is limited by engagement of the abutment 64 on the body 31 and the stop 18 on the member 7 position to engage the abutment 18.

In the latched position of the actuating member shown in FIGURE 8, the return finger 60 lies in the path of rotation of the cams 2. Clockwise rotation of the cams 2 causes the finger 60 to be cammed away from the extension 55, but counterclockwise rotation of the cams 2 will cause one of them to seat against the wall 62 and deflect the arm 60 into engagement with the extension 55 so as to move the latter inwardly or toward the adjacent end of the body 31 an amount sufficient to disengage the cam surfaces 24 and 54. Upon disengagement of the cam surfaces, the spring 16 will restore the actuating member to its neutral position.

Although only clockwise rocking of the actuating member from its neutral position has been described, it will be understood that the actuating member also may be rocked counterclockwise from its neutral position to either a fully latched position or to an intermediate position between the fully latched position and the neutral position and that, in either the latched or the intermediate position, the appropriate fixed and movable switch contacts will be engaged to operate the direction signals at the other side of the vehicle.

The disclosed embodiment is representative of a presently preferred form of the invention, but is intended to be illustrative rather than definitive thereof. The invention is defined in the claims.

What is claimed is:
1. Direction signal operating apparatus comprising: a support member; first latch means on said support mem- ber; an actuating member mounted on said support member for movement relative thereto from a neutral position to a second position; second latch means on said actuating member movable with the latter into and out of latching engagement with said first latch means; abutment means on one of said members engageable with the latch means on the other of said members in response to movement of said actuating member from said neutral position toward said second position and being so positioned with respect to the latch means on the other of said members as to arrest said actuating member in an intermediate position between said neutral second positions; and operating means connected to said actuating member for moving the latter from said neutral position to said intermediate position and being capable of exerting sufficient force on said actuating member to effect disengagement of said abutment means and the latch means on the other of said members and completion of the movement of said actuating member to said second position in which said first and second latch means are in latching engagement with each latch; latch release means carried by one of said members and movable into engagement with one of said first and second latch means for disengaging said first and second latch means; and electrically conductive contacts carried by said members and being engageable in response to movement of said actuating member to either of said intermediate or second positions to condition a direction signaling circuit for operation.

2. The apparatus set forth in claim 1 including spring means acting on said actuating member and constantly urging the latter to said neutral position.

3. The apparatus set forth in claim 1 wherein said abutment means is on said support member.

4. The apparatus set forth in claim 1 including cooperable stop means on each of said members engageable with each other to limit movement of said actuating member beyond said second position.

5. In direction signaling apparatus of the kind having an actuating member mounted on a support member for adjacent cam means rotatable in a path at movement from a neutral position toward a latched operating position, electrical contact means on said members engageable in response to such movement to condition an electrical circuit for operation, operating means for moving said actuating member from said neutral position toward said latched position, and engageable and disengageable latch means on said members for releasably latching said actuating member in said latched position; abutment means on one of said members engageable with the latch means on the other of said members in response to movement of said actuating member from said neutral position toward said latched position to and being so positioned with respect to the latch means on the other of said members as to arrest said actuating member in an intermediate position between said neutral position and said latched position and in which said electrical contacts are engaged to condition said circuit for operation, said operating means being capable of exerting sufficient force on said actuating member to disable said abutment means and move said actuating member from said intermediate position to said latched position and release means carried by said actuating member and movable into the path of said cam means in response to movement of said actuating member to said latched position for effecting disengagement of said latch means when said actuating member is in said latched position.

6. Apparatus as set forth in claim 5 including means reacting between said members for biasing said actuating member to said neutral position from said intermediate position.

7. Apparatus as set forth in claim 5 including means reacting between said members for biasing said actuating member to said neutral position from said latched position.

8. Apparatus as set forth in claim 5 wherein the latch means on said other of said members is flexible.

9. Apparatus as set forth in claim 5 wherein said abutment means forms part of the latch means on said one of said members.

10. Apparatus as set forth in claim 5 including spring means reacting between said members and constantly biasing said actuating member to said neutral position.

11. Apparatus as set forth in claim 5 including cooperable stop means on each of said members engageable with each other to limit movement of said actuating member beyond said latched position.

12. Direction signaling apparatus for use with cam means rotatable in a path, said apparatus comprising a support member; first electrical contact means carried by said support member; an actuating member; means mounting said actuating member on said support member for rocking movement about an axis from a neutral position to an operating position; second electrical contact means connected to said actuating member for rocking movement with the latter into and out of engagement with said first contact means; yieldable latch means on one of said members; abutment means on the other of said members and so positioned as to be engageable with said latch means in response to movement of said actuating member from said neutral position to an intermediate position between said neutral and operating positions for arresting movement of said actuating member to said operating position, said first and second contact means being so located relatively to said members that they are out of engagement with one another when said actuating member is in said neutral position and are in engagement with one another when said actuating member is in each of said intermediate and operating positions; means connected to said actuating member for rocking the latter from said neutral position to said intermediate position and for applying a force of such magnitude on said actuating member as to enable said abutment means to deflect said yieldable latch means and effect movement of said actuating member to said operating position; second latch means on the other of said members engageable with said yieldable latch means to latch said actuating member in said operating position; and latch release means carried by said actuating member and movable into the path of movement of said cam means for engagement thereby in response to movement of said actuating member to said operating position, engagement between said cam means and said return means being operable to disengage said latch means.

13. Apparatus as set forth in claim 12 including spring means acting on said actuating member and biasing the latter to said neutral position.

References Cited
UNITED STATES PATENTS 3,239,619    3/1966    Brown et al.     200—61.34
3,284,592   11/1966    Stoi et al.       200—61.34

BERNARD A. GILHEANY, *Primary Examiner.*

H. A. LEWITTER, *Assistant Examiner.*